(12) United States Patent
Quinn et al.

(10) Patent No.: US 10,976,937 B1
(45) Date of Patent: Apr. 13, 2021

(54) DISPARATE LOCAL AND REMOTE REPLICATION TECHNOLOGIES CONFIGURED FOR THE SAME DEVICE

(71) Applicant: EMC IP Holding Company LLC, Hopkinton, MA (US)

(72) Inventors: Brett A. Quinn, Lincoln, RI (US); Douglas E. LeCrone, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 64 days.

(21) Appl. No.: 15/278,381

(22) Filed: Sep. 28, 2016

(51) Int. Cl.
  *G06F 3/06* (2006.01)
(52) U.S. Cl.
  CPC ............ *G06F 3/0619* (2013.01); *G06F 3/065* (2013.01); *G06F 3/067* (2013.01)
(58) Field of Classification Search
  None
  See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,912,629 B1* | 6/2005 | West | G06F 11/1456 711/161 |
| 6,954,835 B1 | 10/2005 | LeCrone et al. | |
| 6,968,369 B2 | 11/2005 | Veprinsky et al. | |
| 6,986,009 B1 | 1/2006 | LeCrone et al. | |
| 7,054,883 B2 | 5/2006 | Meiri et al. | |
| 7,546,323 B1* | 6/2009 | Timmins | G06F 11/1464 |
| 7,707,186 B2 | 4/2010 | LeCrone et al. | |
| 7,840,595 B1* | 11/2010 | Blitzer | G06F 11/1458 707/781 |

(Continued)

OTHER PUBLICATIONS

Lincoln Spector, "Using More Than One Backup Program", PCWorld [online], Feb. 2011 [retrieved on Jun. 11, 2019]. Retrieved from the Internet: <URL: https://www.pcworld.conn/article/220095/2_backup_programs.html> (Year: 2011).*

(Continued)

*Primary Examiner* — Edward J Dudek, Jr.
*Assistant Examiner* — Ralph A Verderamo, III
(74) *Attorney, Agent, or Firm* — Muirhead and Saturnelli, LLC

(57) ABSTRACT

Data replication techniques may include receiving, at a first data storage system, a write operation that writes first data to a source logical device, wherein the source logical device is configured for remote replication using a first replication technology and also configured for remote replication using a second replication technology different from the first replication technology. The first technology may be a first vendor and the second replication may be from a second vendor different from the first vendor. Responsive to receiving the write operation on the first data storage system, processing may be performed comprising: replicating the write operation and writing the first data to a first target logical device on a second data storage system using the first replication technology; and replicating the write operation and writing the first data to a second target logical device on a third data storage system using the second replication technology.

16 Claims, 7 Drawing Sheets

(56) References Cited

U.S. PATENT DOCUMENTS

| | | | |
|---|---|---|---|
| 8,117,235 B1* | 2/2012 | Barta | G06F 3/0607 |
| | | | 707/635 |
| 8,335,899 B1 | 12/2012 | Meiri et al. | |
| 8,352,431 B1* | 1/2013 | Protopopov | G06F 17/30082 |
| | | | 707/640 |
| 9,632,716 B1* | 4/2017 | Harris, Jr. | G06F 3/0683 |
| 9,785,510 B1* | 10/2017 | Madhavarapu | G06F 3/065 |
| 2001/0029502 A1* | 10/2001 | Oeda | G06F 16/256 |
| 2005/0050115 A1* | 3/2005 | Kekre | G06F 11/2071 |
| 2006/0195666 A1* | 8/2006 | Maruyama | G06F 3/065 |
| | | | 711/162 |
| 2014/0149666 A1* | 5/2014 | Nakagawa | G06F 3/0605 |
| | | | 711/114 |
| 2016/0098324 A1* | 4/2016 | Sugabrahmam | G06F 9/50 |
| | | | 714/6.23 |
| 2017/0220275 A1* | 8/2017 | Anzai | G06F 3/0619 |

OTHER PUBLICATIONS

LinuxClustering.net post entitled "Host-Based Replication vs SAN Replication." 2 pages, posted posted Nov. 7, 2012. Retrieved from Internet: <https://www.linuxclustering.net/2012/11/07/host-based-replication-vs-san-replication/>. (Year: 2012).*

* cited by examiner

DISPARATE LOCAL AND REMOTE REPLICATION TECHNOLOGIES CONFIGURED FOR THE SAME DEVICE

BACKGROUND

Technical Field

This application generally relates to data storage and more particularly to techniques used in connection with data replication.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform I/O (input/output) operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain copies of data on different systems in different locations. Having copies of the same data on different systems in different locations may be used for a variety of reasons including reducing the likelihood of data loss. For example, in some implementations, a primary or source data site, such as a first or primary data storage system, may be configured in a partner relationship with a second or remote data storage system whereby the second data storage system includes a mirror or copy of data of one or more devices of the first data storage system.

SUMMARY OF THE INVENTION

In accordance with one aspect of techniques herein is a method of performing data replication comprising: receiving, at a first data storage system, a write operation that writes first data on a source logical device, wherein the source logical device is configured for remote replication using a first replication technology and also configured for remote replication using a second replication technology different from the first replication technology, said first technology being from a first vendor and said second replication being from a second vendor different from the first vendor; and responsive to receiving the write operation on the first data storage system, performing processing comprising: replicating the write operation and writing the first data to a first target logical device on a second data storage system using the first replication technology; and replicating the write operation and writing the first data to a second target logical device on a third data storage system using the second replication technology. The source logical device and the first target logical device may be configured as a first mirrored pair of logical devices where the source logical device is mirrored on the first target logical device using the first replication technology. The source logical device and the second target logical device may be configured as a second mirrored pair of logical devices where the source logical device is mirrored on the second target logical device using the second replication technology. Data replication of the source logical device to the first target logical device may be performed using the first replication technology operating in a first replication mode, and data replication of the source logical device to the second target logical device may be performed using the second replication technology operating a second replication mode, where each of the first replication mode and the second replication mode may be one of a plurality of replication modes. The plurality of replication modes may include at least one synchronous replication mode and at least one asynchronous replication mode. The plurality of replication modes may include a first asynchronous mode and a second asynchronous mode, wherein the first asynchronous mode may perform data replication directly between two data storage systems, and wherein the second asynchronous mode may perform data replication indirectly between two data storage systems using an intervening data mover. The intervening data mover may receive data modifications from one of the two data storage system and writes the data modifications to another of the two data storage systems. The first replication mode may be a synchronous replication mode whereby the source logical device and the first target logical device may mirror each other and denote a same point in time version, and wherein the second replication mode may be an asynchronous mode whereby the second target logical device may represent an earlier point in time version of the source logical device. The source logical device on the first data storage system may be configured to have data automatically replicated on the first target logical device of the second data storage system, and the source logical device on the first data storage system may be configured to have data automatically replicated on the second target logical device of the third data storage system. The source logical device may be configured for local replication using a first local replication technology on a third target logical device included in the first data storage system with the source logical device. The source logical device may be configured for local replication using a second local replication technology on a fourth target logical device included in the first data storage system with the source logical device, and the first local replication technology and the second local replication technology may each from a different vendor. The first local replication technology may use a first snapshot technique to create the third target logical device as a first snapshot of the source logical device. The second local replication technology may use a second snapshot technique to create the fourth target logical device as a second snapshot of the source logical device. The second local replication technology may create the fourth target logical device that is a physical copy of the source logical device.

In accordance with another aspect of techniques herein is a system comprising: one or more processors; and a memory comprising code stored therein that, when executed by at least one of the one or more processors, performs a method for data replication comprising: receiving, at a first data storage system, a write operation that writes first data on a source logical device, wherein the source logical device is configured for remote replication using a first replication technology and also configured for remote replication using a second replication technology different from the first replication technology, said first technology being from a first vendor and said second replication being from a second vendor different from the first vendor; and responsive to receiving the write operation on the first data storage system, performing processing comprising: replicating the write operation and writing the first data to a first target logical device on a second data storage system using the first replication technology; and replicating the write operation and writing the first data to a second target logical device on a third data storage system using the second replication technology. The source logical device may be configured for local replication using a first local replication technology on a third target logical device included in the first data storage system with the source logical device, and the source logical device may also be configured for local replication using a second local replication technology on a fourth target logical device included in the first data storage system with the source logical device. The first local replication technology and the second local replication technology may each be provided by a different vendor.

In accordance with another aspect of techniques herein is a computer readable medium comprising code stored thereon that, when executed, performs a method for data replication comprising: receiving, at a first data storage system, a write operation that writes first data to a source logical device, wherein the source logical device is configured for remote replication using a first replication technology and also configured for remote replication using a second replication technology different from the first replication technology, said first technology being from a first vendor and said second replication being from a second vendor different from the first vendor; and responsive to receiving the write operation on the first data storage system, performing processing comprising: replicating the write operation and writing the first data to a first target logical device on a second data storage system using the first replication technology; and replicating the write operation and writing the first data to a second target logical device on a third data storage system using the second replication technology. The source logical device may be configured for local replication using a first local replication technology on a third target logical device included in the first data storage system with the source logical device, and the source logical device may be configured for local replication using a second local replication technology on a fourth target logical device included in the first data storage system with the source logical device. The first local replication technology and the second local replication technology may each be provided by a different vendor.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
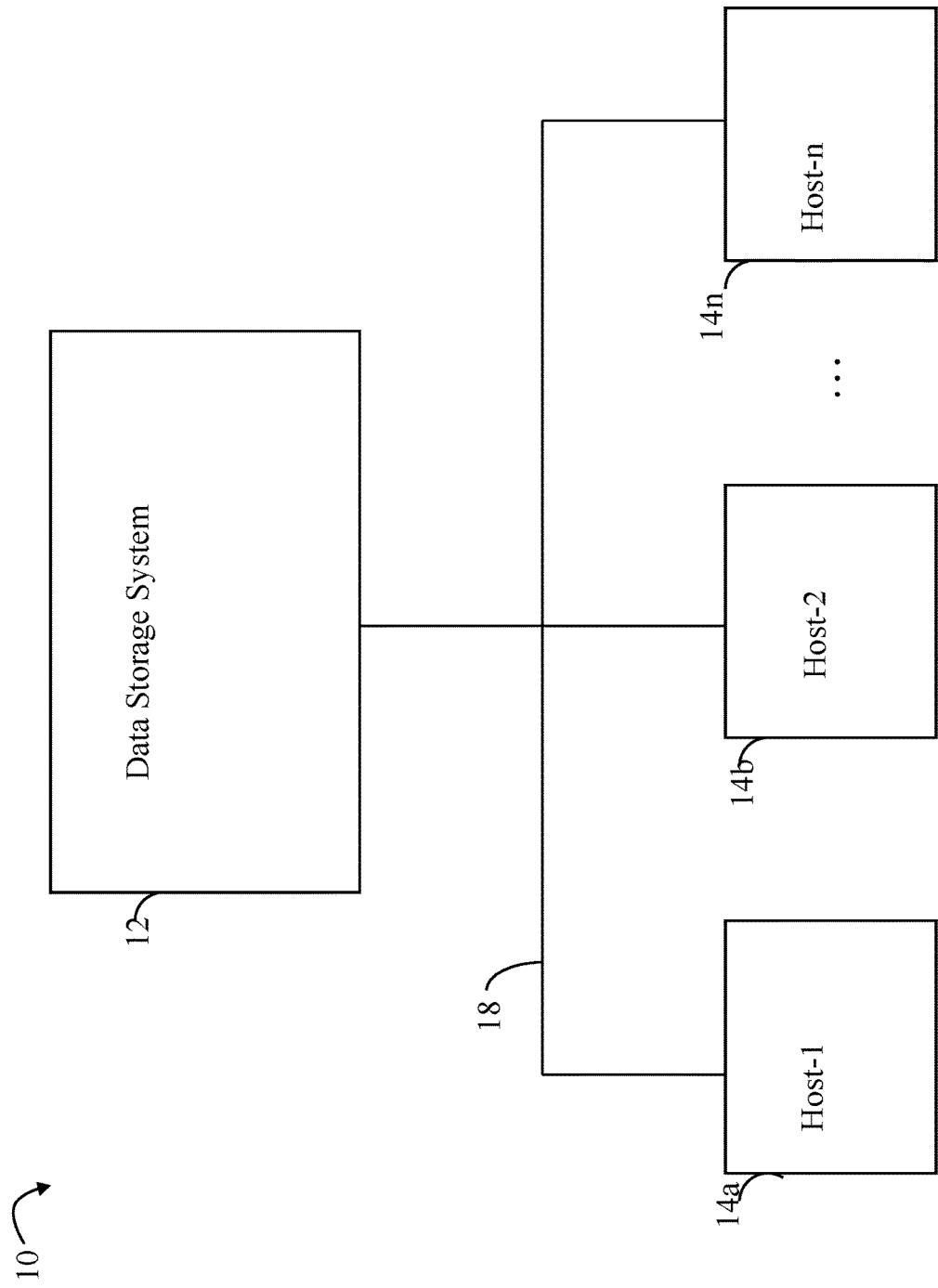
FIGS. 1, 3, 4, 5 and 6 are examples of embodiments of systems and components that may utilize the techniques described herein.

Referring to FIG. 1, shown is an example of an embodiment of a system and components that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, z System IBM Mainframe, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, FICON, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
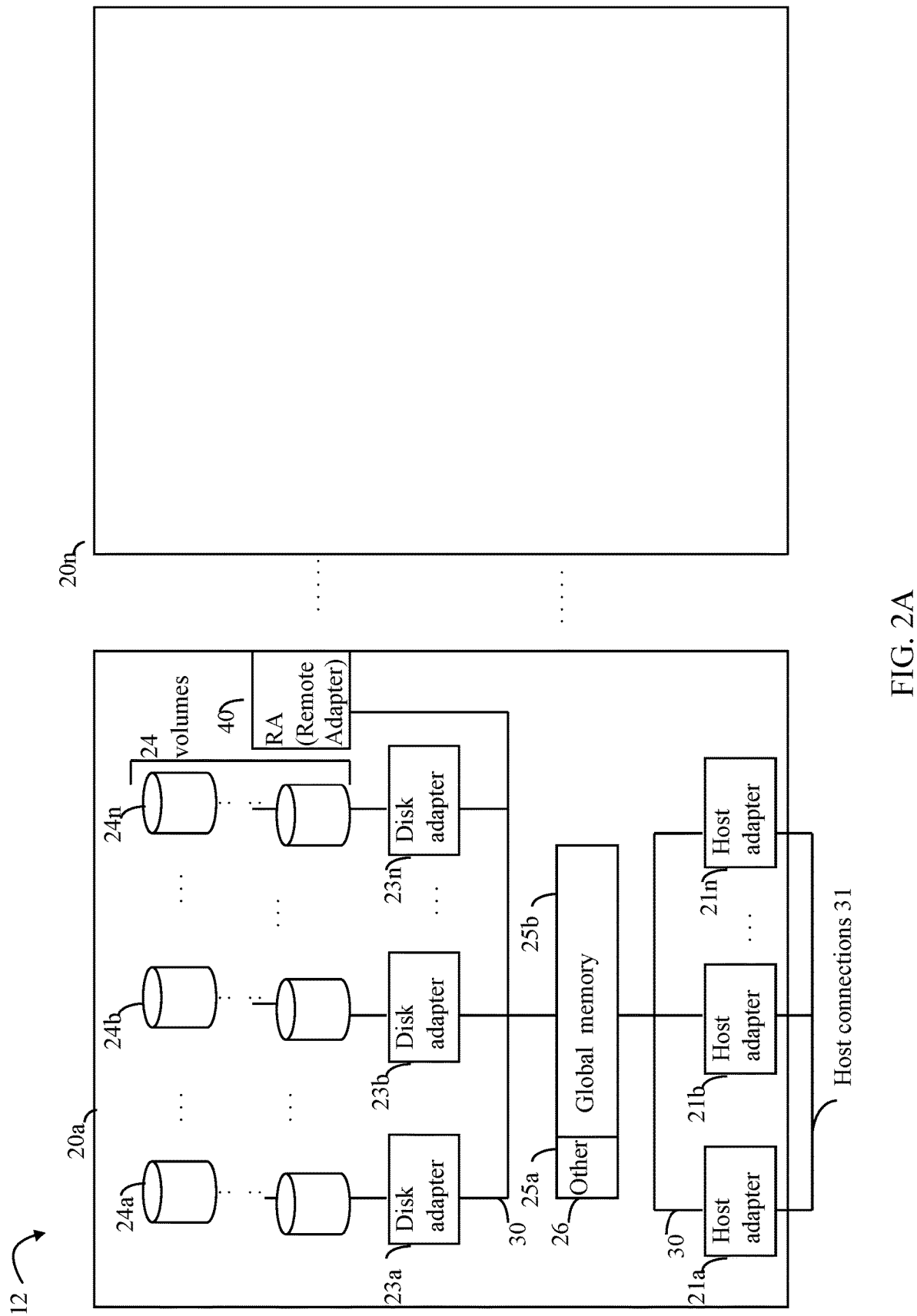
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices, such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable physical storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. For example, one or more logical devices or volumes may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated physical storage devices or drive(s) and logical devices residing thereon.

Figure 2B:
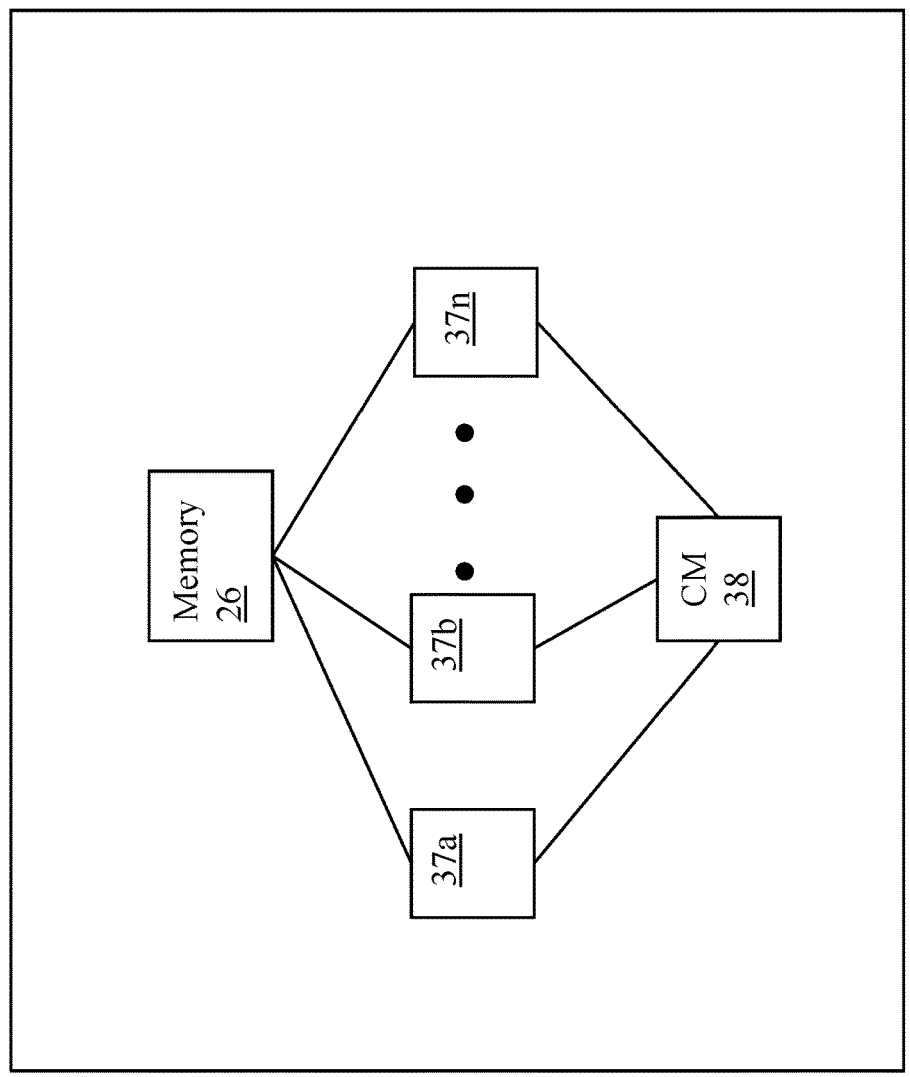
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

An embodiment of a data storage system in accordance with techniques herein may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology known in the art. As described elsewhere herein, such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device for non-disruptive backup. A snapshot may appear like a normal logical device and may be used for backup, testing, and the like. Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage. With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or logical device are redirected (written) to a new location.

Described in following paragraphs are techniques that may be used with multiple, disparate or different replication technologies from different vendors or manufacturers. In at least one embodiment, such replication technologies may include at least two replication technologies each from a different vendor or manufacturer. Such multiple different replication technologies may coexist in the same data storage system, data center or physical data storage site. Each of the different replication technologies may replicate a source logical device to a target logical device. In an embodiment in accordance with techniques herein, the same source logical device may be configured for use with the multiple different replication technologies from different vendors. In this manner, the same source logical device may be replicated to multiple different target local devices where each of the different target logical devices is created using a different one of the multiple replication technologies from different vendors.

Generally, as noted above, replication technologies (also referred to as data replication technologies), techniques and facilities may be classified into two major categories—local and remote. In at least one embodiment, local replication refers to replicating data within the same data storage system. For example, a local replication technology may be used to locally replicate a source logical device to a target logical device on the same data storage system. Remote replication refers to replicating data at a remote site (e.g., second or different physical data storage system different from system including the source data that is replicated on the remote site). For example, a remote replication technology may be used to remotely replicate a source logical device of a first data storage system to a target logical device on another second data storage system. In at least one embodiment in accordance with techniques herein, the different replication technologies from different vendors may include one or more local replication technologies and may also include one or more remote replication technologies, and the source logical device of a first data storage system may be configured for replication using each such different or disparate replication technology.

It should be noted such replication technologies used with techniques herein may be considered disparate or different with respect to one more characteristics or attributes. For example, two remote replication technologies may be considered different or disparate because each is provided by a different vendor and use the particular vendor's implementation and replication technique. Additionally, each such replication technology may be considered disparate or different because each is a different replication facility or product provided by a different vendor. In at least one embodiment in accordance with techniques herein, two replication technologies may be considered different or disparate because each is provided by a different vendor. The two replication technologies may or may not employ some of the same algorithms for replication. For example, two local replication technologies from two different vendors may each be a snapshot facility using the same COFW technique. However, they may be considered different or disparate due to the different vendors providing each for use in different data storage system environments, storage subsystems, and the like.

Users of data storage systems may desire and utilize such a disparate or different combination of different replication technologies, such as from different vendors, with the same source logical device for many different reasons. For example, such a capability may be desired for use when transitioning between different replication technologies of different vendors, or to allow a user to deploy his/her optimal combination of replication technologies and functions for the particular user requirements and environment. Such a capability may be desired in order to allow a source logical device of a data storage system to be configured for replication using multiple different replication technologies from different vendors without requiring each specific vendor's hardware, such as particular storage or I/O subsystem, being installed. Thus, techniques herein may allow a user to exploit strengths of the different replication technologies by enabling coexistence and simultaneous use and configuration of the different replication technologies using the same source logical device in the same data storage system. Such techniques herein may also be used, for example, to allow a user to migrate from one replication technology from a first vendor to a second replication technology from a second vendor without impacting operations or compromising the data protections provided by the different replication technologies.

Figure 3:
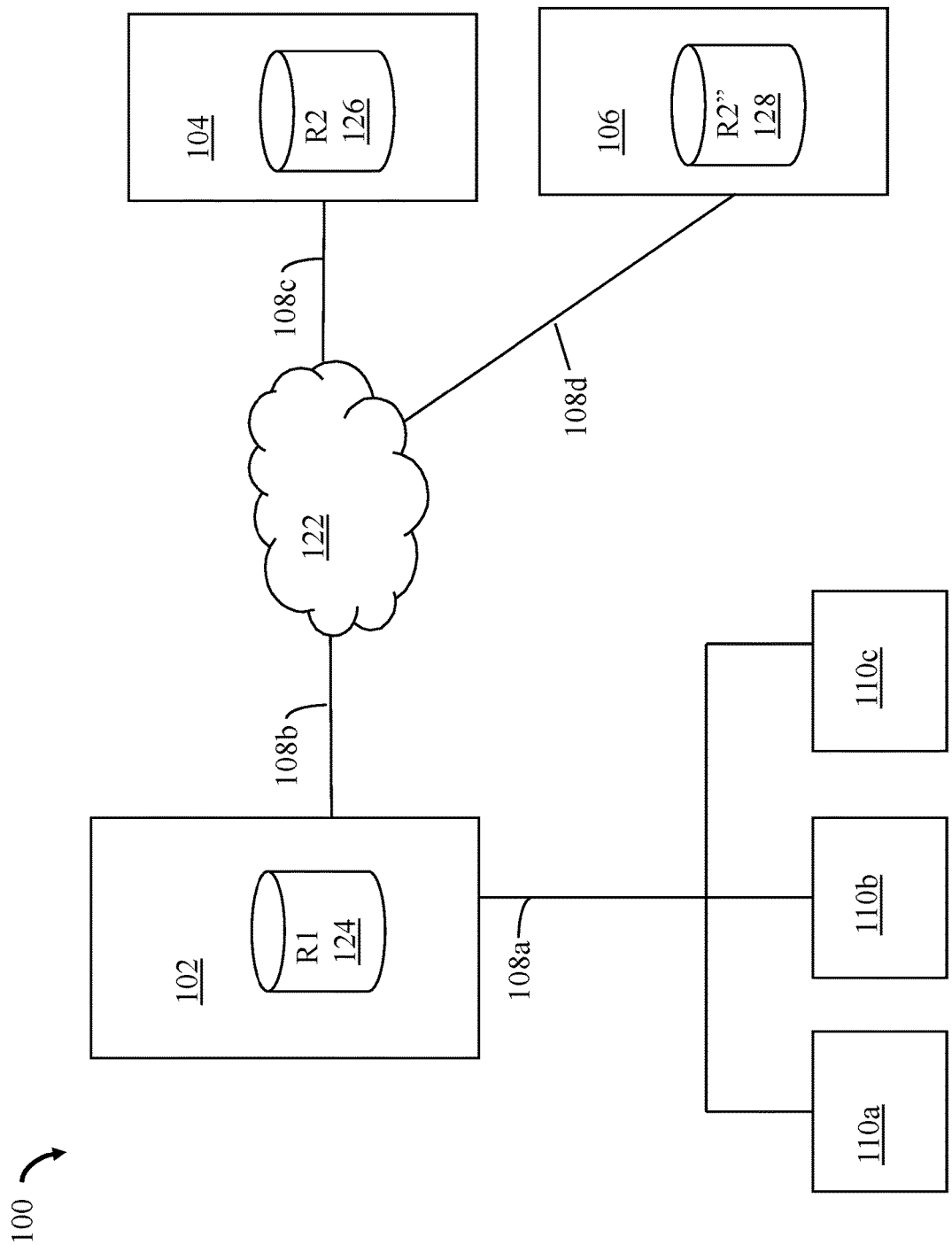

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage systems 102, 104 and 106, and hosts 110a, 110b and 110c. The data storage systems 102, 104, 106 may be remotely connected and communicate over network 122, such as the Internet or other private network, and facilitate communications with the components connected thereto. Hosts 110a, 110b and 110c may perform operations to data storage system 102 over connection 108a. The hosts 110a, 110b and 110c may be connected to the data storage system 102 through connection 108a which may be, for example, network or other type of communication connection. Although not illustrated, the hosts 110a-110c may also be directly connected to a network such as the Internet.

The data storage systems 102, 104 and 106 may include one or more logical devices. In this example, data storage system 102 includes logical device R1 124, data storage system 104 includes logical device R2 126, and data storage system 106 includes logical device R2" 128. All the data storage systems 102, 104, 106 may include one or more other logical and/or physical devices. Data storage system 102 may be characterized as local with respect to hosts 110a, 110b and 110c. Data storage systems 104, 106 may be characterized as remote with respect to hosts 110a, 110b and 110c. For example, in some embodiments in accordance with techniques herein, the distance between the data storage systems 102 and 104, and distance between 102 and 106 may be 200 km or more.

In at least one embodiment, one or more of the hosts 110a-110c may access logical device R1 124 over connection 108a. In at least one embodiment in accordance with techniques herein, the logical devices R1 124, R2 126 and R2" 128 may have a data layout based on the CKD (count key data) architecture and format, and one or more of the hosts 110a-c may access data of device R1 124 using a FICON connection. IBM's FICON (Fiber Connection) is a Fibre Channel protocol that provides high-speed connectivity between a channel and a control device and allows multiple data exchanges in full duplex mode. FICON may be used with Fibre Channel communication. FICON is compatible with z/Architecture computing systems in connection with I/O devices performing I/O processing therewith.

In at least one embodiment in accordance with techniques herein, elements 102, 104 and 106 may each be a Symmetrix® data storage system, provided by EMC Corporation of Hopkinton, Mass., which is a data storage system compatible with FICON. For further discussion of FICON in connection with IBM System/390, a precursor to IBM System z, see DeCusatis, et al., "Fiber optic interconnects for the IBM S/390 Parallel Enterprise Server G5," IBM J. Res. Develop., Vol. 43, No. 5/6, September/November 1999, pp. 807-828, which is incorporated herein by reference.

CKD may be characterized as a data storage device architecture where each storage device record includes of a count field, an optional key field, and a ("user") data field with error correction/detection information appended to each field. The sizes of the records within a single device may vary with the CKD architecture. Since data record lengths can vary, they all have an associated count field which indicates the size of the key if used and the size of the data. The count field has the identification of the physical location in cylinder-head-record format, the length of the key, and the length of the data. The key may be omitted or consist of a string of characters. Most often the key is omitted, the record located sequentially or by direct cylinder-head-record addressing. If it is present, the key is typically a copy of the first n bytes of the data record but can be any data which will be used to find the record. The key (and hence the record) is locatable via hardware commands.

As known in the art and mentioned above, I/O requests directed to devices in accordance with the CKD format may be in the form of channel programs (also known as channel word programs or chains) including an ordered sequence of channel command words (CCWs); or transport mode (TCW) and the associated device command words (DCWs). Additionally, channel word programs, processing I/O requests, and the like, are described also, for example, in U.S. Pat. No. 6,954,835, INTERCEPTING CONTROL OF A HOST I/O PROCESS, issued Oct. 11, 2005 (the '835 patent); U.S. Pat. No. 6,986,009, INTERCEPTING CONTROL OF A HOST I/O PROCESS, issued Jan. 10, 2006 (the '009 patent); and U.S. Pat. No. 7,707,186, issued Apr. 27, 2010, METHOD AND APPARATUS FOR DATA SET MIGRATION (the '186 patent), all of which are incorporated by reference herein.

The host 110a may issue a command, such as to write data to logical device R1 of data storage system 102. In some instances, it may be desirable to copy data from the logical storage device R1 to another second logical storage device, such as R2, provided in a different remote site or location so that if a disaster occurs that renders R1 inoperable, the host (or another host) may resume operation using the data of R2. Such a capability is provided, for example, by the SRDF® products provided by EMC Corporation of Hopkinton, Mass. Communication between Symmetrix™ data storage systems using SRDF® is described, for example, in U.S. Pat. Nos. 5,742,792, 5,544,347, and 7,054,883, and 8,335, 899, all of which are incorporated by reference herein in their entirety. With SRDF®, a user may denote a first logical storage device, such as R1 124, as a source logical storage device and a second logical storage device, such as R2 126, as a target logical storage device. In at least one embodiment using Symmetrix™ data storage systems, other incarnations of remote replication may provide a peer to peer copy relationship between the local and remote storage devices. In this example, the host 110a interacts (e.g., issues I/O requests or commands) directly with the device R1 of data storage system 102, but any data changes made (e.g., such as due to writes to the logical device R1) are automatically provided to the R2 device of data storage system 104 using SRDF®. In operation, the host 110a may read and write data using the R1 volume in 102, and SRDF® may handle the automatic mirroring and updating of data from R1 to R2 in data storage system 104.

As illustrated in connection with other figures herein, data storage system 102 may have one or more RAs included therein to facilitate remote connections to the data storage system 104. Communications between storage system 102 and 104 may be made over connections 108b, 108c to network 122. Data storage system 104 may include one or more RAs for use in receiving the communications from the data storage system 102. The data storage systems may communicate, for example, over Gigabit Ethernet connections supporting TCP/IP traffic. The SRDF® replication functionality may be facilitated with the RAs provided at each of the data storage systems 102 and 104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with SRDF®, a single RDF link or path may be between an RA of the system 102 and an RA of the system 104. Data written by one of the hosts 110a-c to the logical device R1 may be automatically transmitted, using RDF, over an RDF link 108b-108c, in connection with performing remote data replication over the RDF link between the systems 102 and 104.

An embodiment may also include the concept of a remote data facility (RDF) group in which one or more devices on a data storage system are associated with a particular group under the control of one or more RAs which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using SRDF® functionality.

Techniques herein may be used with SRDF®, or more generally any RDF, operating in one or more different supported modes. For example, such modes may include SRDF® operating in synchronous mode and asynchronous mode. For example, in connection with SRDF®, the host may issue a write to an R1 logical device in a first data storage system and the data change is propagated to the R2 logical device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system.

Depending on the physical distance between the data storage systems 102, 104, it may be desirable to operate in a mode such as asynchronous to avoid host timeouts while the host awaits acknowledgement regarding completion of a host I/O.

Described in following paragraphs are techniques that may be used in connection with performing data replication, such as in an asynchronous manner such as SRDF® operating in an asynchronous mode (SRDF®/A), or in a synchronous manner such as with SRDF® operating in a synchronous mode. With asynchronous mode remote data replication, a consistent point in time image is provided on the target R2 device that is only slightly behind (in terms of writes performed) the source R1 device. With asynchronous data replication such as with SRDF®/A, changes or writes to the first device or group of devices are collected for each occurrence of a time period, such as every X seconds, and then transferred to the R2 system to be applied to the second R2 device or group of devices. Although the remote R2 copy of the data will never be as current as the primary R1 copy, this method can replicate data over considerable distances and with reduced bandwidth requirements and minimal impact on host performance.

Consistent with other discussion herein, R1 124 and R2 126 may be configured as a mirrored pair of logical devices for which remote replication is performed where R1 124 is the source logical device of the local first data storage system 102, and where writes or modifications to R1 124 are mirrored to the R2 126 target logical device on the remote data storage system 104 using a remote data facility such as SRDF® by EMC Corporation. Writes or modifications may be applied to both R1 and R2 in the same specified sequence or ordering in order to maintain write consistency. An embodiment in accordance with techniques herein may perform synchronous replication or asynchronous replication. With synchronous replication, there is no delta or difference between the data copies on the first and second sites. In other words, the data copies maintained on the two sites (e.g., first or local site and second or remote site) mirror one another whereby the same modifications, such as the same writes, are applied to both copies on both sites so that the data copies on both sites denote the same point in time version or same physical copy of the data. Synchronous replication may be contrasted with asynchronous replication where such strict synchronization or mirroring between the two physical data copies on the two sites is not required or guaranteed. With asynchronous replication, there may be a delta or difference between the data copies on the two sites. For example, the first site may include the most recent or most up to date copy of the data with all modifications applied thereto. However, the second data copy at the second site may not have all modifications applied thereto so that the second data copy at the second point in time may represent an earlier version or point in time data copy than that of the first site, but with logical data integrity preserved (e.g., write consistency maintained).

In addition to the source logical device R1 124 being configured for use with a first remote replication technology SRDF® by a first vendor, EMC Corporation, the source logical device R1 124 may also be configured for use with a second remote replication technology, such as PPRC (peer to peer remote copy) by IBM Corporation. PPRC is a mirroring technique used to maintain consistent copies of data at two different data storage systems or sites. In a manner similar to that as described above for SRDF® as the first remote replication technology, the second remote replication technology such as PPRC, may also support multiple replication modes including synchronous mode and an asynchronous mode that operate in a manner similar to that as described above.

In at least a first embodiment in accordance with techniques herein, the source logical device R1 124 may be configured for remote replication using the first remote replication technology, SRDF®, by EMC Corporation, where SRDF® is configured to perform asynchronous replication of R1 124 to the first target logical device R2 126 of the second remote data storage system 104. Additionally, the source logical device R1 124 may be configured for remote replication using the second remote replication technology, PPRC, by IBM Corporation where PPRC is configured to perform synchronous replication of R1 124 to the second target logical device R2" 128 of the second remote data storage system 104. In the foregoing first embodiment, the source logical device R1 124 is configured for remote replication using two different or disparate remote replication technologies by different vendors. Data written to the source logical device R1 124 may be automatically replicated to the first target logical device R2 126 using the first remote replicate technology, SRDF®, by EMC Corporation. Additionally, such data written to the source logical device R1 1124 may be automatically replicated to the second target logical device R2" 128 using the second remote replication technology, PPRC, by IBM Corporation. In this particular example, the writes to R1 124 are replicated to R2 126 in an asynchronous manner using SRDF®, and the writes to R1 124 are replicated to R2" 128 in a synchronous manner using PPRC. In the foregoing example, the first and second remote replication technologies utilized may be characterized as disparate, for example due to the different vendors of each replication technology, the fact that the first remote replication technology is configured in a mode to perform asynchronous replication and the second remote replication technology is configured in a mode to perform synchronous replication.

As a variation, the R1-R2 logical device pairing for remote replication using SRDF® may be configured to operate in a synchronous mode to perform synchronous replication, and the R1-R3 logical device pairing for remote replication using PPRC may be configured to operate in an asynchronous mode to perform asynchronous replication.

As yet a further variation, the R1-R2 logical device pairing for remote replication using SRDF® and the R1-R3 logical device pairing for remote replication using PPRC may both be configured to perform synchronous replication, or both SRDF® and PPRC may be configured to perform asynchronous replication.

In such an embodiment, for example, where the R1-R2 logical device pairing for remote replication using a first remote replication technology using SRDF® may be configured to operate in an asynchronous mode to perform asynchronous replication, and the R1-R3 logical device pairing for the second remote replication technology using PPRC may be configured to operate in synchronous mode to perform synchronous replication, such capability provides for replication of the same R1 source logical device allowing for consistent migration between local and remote data storage systems or data centers, replication technology coexistence, and/or replication technology conversion (e.g., conversion from the second remote replication technology to the first replication technology).

It should also be noted that in at least one embodiment as described above, all 3 data storage systems 102, 104 and 106 may be the same type, model and/or family of data storage system, such as the Symmetrix® data storage system provided by the same storage vendor, such as EMC Corporation. Thus, generally, the data storage systems 102, 104 and 106 may be all provided by the same vendor. As a variation, one or more of the data storage systems 102, 104 and 106 may be a different type, mode and/or family of data storage system provided by a different storage vendor. For example, system 102 may be a Symmetrix® data storage system by EMC Corporation, and systems 104 and 106 may be a data storage systems other than a Symmetrix® data storage system, where systems 104 and 106 are provided by a different vendor other than EMC Corporation. As another example, systems 104 and 106 may be provided by EMC Corporation and system 102 may be provided by a different vendor other than EMC Corporation.

Figure 4:
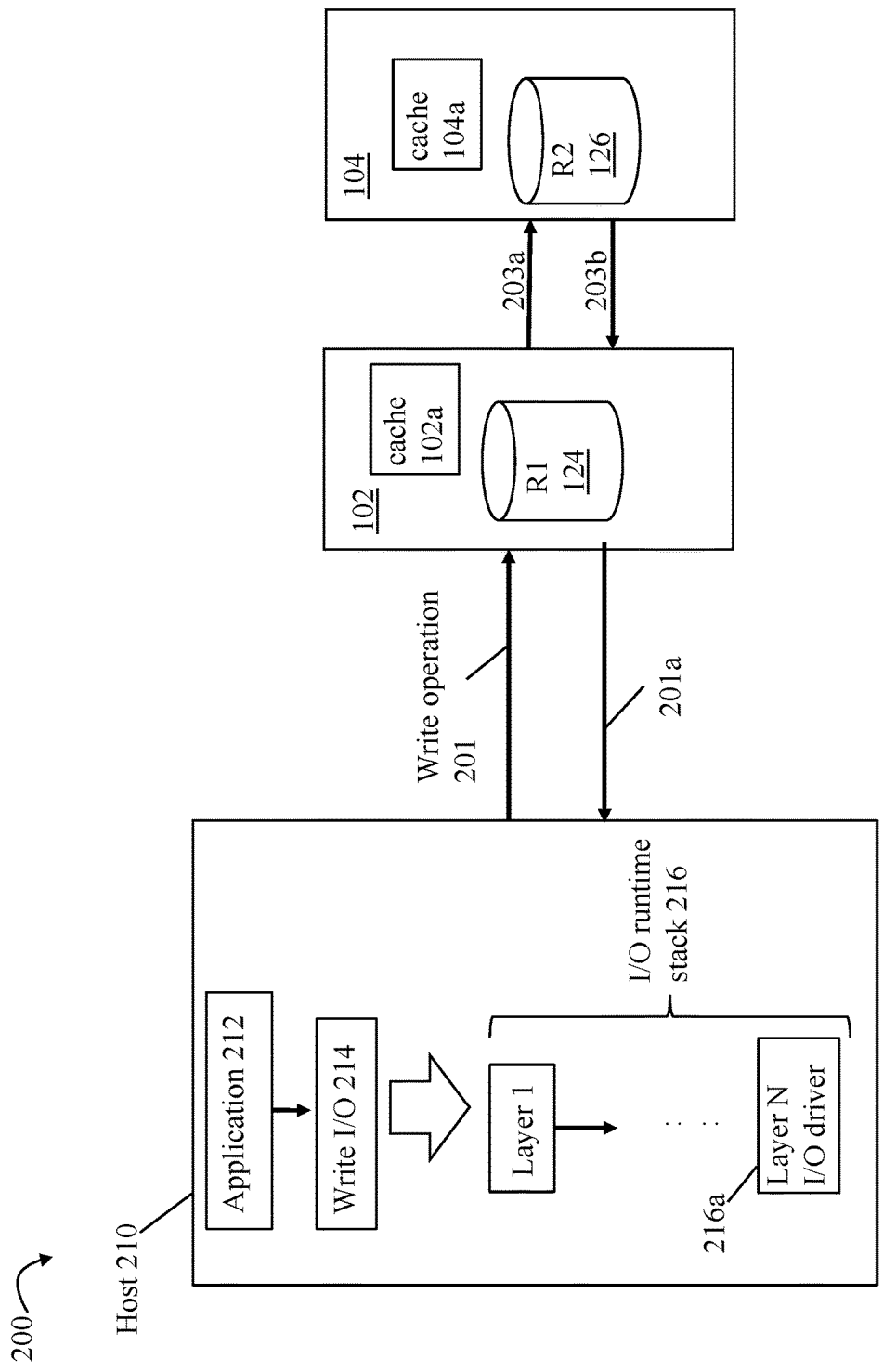

Described in connection with FIG. 4 is an example illustrating in more detail how remote replication may be performed between two remote systems, such as system 102 and 104. More generally, such description noted below in connection with FIG. 4 is also generally applicable for use between systems 102 and 106 (e.g., source logical device R1 124 and target logical device R2" 128).

Referring to FIG. 4, shown is an example illustrating components and processing that may be performed in an embodiment in accordance with techniques herein. The example 200 includes host 210, the local or R1 data storage system 102, and the remote or second R2 data storage system 104. Elements 102 and 104 may be as described in connection with FIG. 3 whereby the R1 logical device 124 may be configured for remote replication as the R2 logical device 126 on the second data storage system 104. The host 210 may be a host similar to the hosts 110a-c and others as described herein. Additionally, the host 210 may include application 212 executing thereon which may issue a write I/O operation 214 that results in modification of data stored at a target location or offset on a logical device.

It should be noted that the write I/O operation 214 may generally denote a modification to any data stored on the logical device at the target location on a logical device. The write operation 214 may be a direct modification of user data, such as a write by the application 212 to update user data stored in a file. Additionally, and more generally, the write operation 214 may denote a modification to user data as well as other types of data stored on the logical device besides user data. Such other types data of the logical device may also include, for example, metadata of the logical device, non-user data sets, and the like.

Metadata of a logical device that may be modified may include structural information about a data layout of the logical device. For example, the metadata may indicate information such as particular offsets or locations on the logical device where a file system is stored, where each file is stored, where extents or portions of each file are stored, and the like. As a file may increase in size, for example, additional extents may be added to the file whereby such extents of the file may be located at noncontiguous logical offsets or logical addresses of the logical device. In a similar manner, as the file stored on the logical device decreases in size (e.g., such as portions of the file are deleted), the file's metadata stored on the logical device may also change to denote the removed extents. Thus, metadata may be stored at various logical addresses or locations of the logical device where such stored metadata is modified as a result of different operations performed by the application.

In this manner, the write operation 214 may denote generally a write operation that modifies data stored on the logical device whereby the write may modify user data and/or other types of non-user data as noted herein and more generally known in the art.

The write I/O 214 may result in execution of a sequence of runtime calls or invocations of the I/O path on the host as denoted by the I/O runtime stack 216. Generally, the I/O runtime stack 216 may be characterized as a sequence of layered calls performed to process the write operation 214. Layer 1 may denote the highest layer of the stack 216 and layer N may denote the bottom or lowest layer in the stack 216. As known in the art, the stack 216 may include, for example, a logical volume manager, one or more I/O drivers, and the like. For example, if the write 214 writes user data to a location in a user data file, the stack 216 may include one or more layers that map the particular file location of the user data file to a host side logical device and associated logical device location. Additionally, the stack 216 may include an I/O driver 216a which may be characterized as a low level I/O driver that, for example, forms I/O command blocks sent to the system 102 and also receives responses from the system 102 in accordance with the particular protocols supported in an embodiment.

The local data storage system 102 may write the data of write operation to cache 102a of the local data storage system 102. Consistent with other discussion herein, the cached write data may be later destaged to physical non-volatile storage provisioned for the R1 logical device 124. Additionally, to perform the remote replication on the remote system 104, the local data storage system 102 issues another second write operation 203a to the remote data storage system 104 to replicate the write operation data to the R2 device 126. Upon receiving the second write 203a, the second write operation data is stored in cache 104a of the system 104. Consistent with other discussion herein, the cached write data stored in cache 104a may be later destaged to physical non-volatile storage provisioned for the R2 logical device 126. Once the second write operation data 203a has been written to cache 104a, an acknowledgement 203b regarding completion of the second replication write may be returned by the system 104 to the system 102.

In at least one embodiment where synchronous remote data replication from R1 124 to R2 126 is performed, system 102 may return an acknowledgement 201a to the host regarding completion of the host write operation 201 only after system 102 receives the acknowledgement 203b from system 104 regarding completion of the second replication write. In at least one embodiment where asynchronous remote data replication from R1 124 to R2 126 is performed, system 102 may return an acknowledgement 201a to the host regarding completion of the host write operation 201 once the write operation data is written to the local system cache 102a (e.g., does not require that the system 102 receives the acknowledgement 203b from system 104 regarding completion of the second replication write before returning acknowledgement 201a to the host regarding completion of the write operation).

Figure 5:
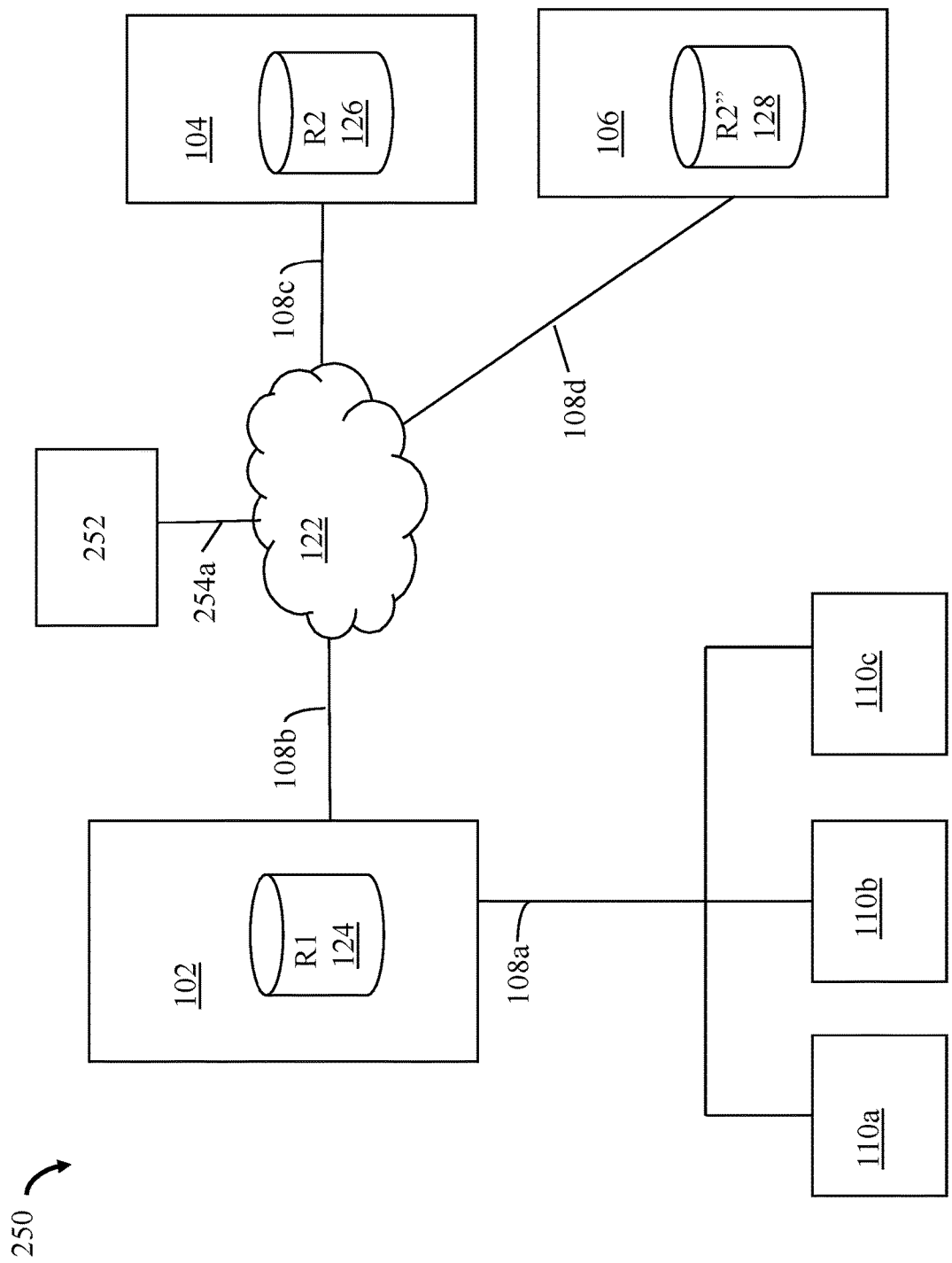

Referring to FIG. 5, shown is another example illustrating components and systems that may be used in an embodiment in accordance with techniques herein. The example 250 may include systems and components as described in connection with FIG. 3 but with differences noted below where the R1 124-R2 126 logical device pairing may be configured as a mirrored pair for remote replication using a first remote replication technology, XRC (extended remote copy) by IBM Corporation (described in more detail below), and wherein the R1 124-R2" 128 logical device pairing may be configured as a mirrored pair for remote replication using a second remote replication technology, SRDF®, by EMC Corporation, operating in asynchronous replication mode. Additionally, the example 250 includes host 252 which is similar to the hosts 110a-c as described elsewhere herein. The host 252 may communicate over connection 254a, network 122, and connection 108b with data storage system 102. Additionally, the host 252 may communicate over connection 254a, network 122 and connection 108c with data storage system 104.

The host 252 may have an architecture based on IBM Corporation's System z architecture and computing environment. System z components, such as the host 252, may operate with IBM's z/OS (operating system) and/or other zSystem operating systems. Input/Output (I/O) devices may be coupled to interact with mainframe computers, such as IBM's System z computing environment, that may include an I/O subsystem that communicates with the I/O devices over communication channels. The I/O subsystem controls data flow between I/O devices and main storage. The I/O subsystem may be coupled to the central processors of the main system and may communicate directly with the I/O devices. I/O subsystem may communicate with the I/O devices using multiple types of interfaces, including, for example, communication channels such as Fibre channels. For further discussion of z/OS and z/Architecture components, see, for example, Loveland, et al., "Testing z/OS: The premier operating system for IBM's zSeries server," IBM Systems Journal, Vol. 41, No. 1, 2002, pp. 55-73, and Plambeck, et al., "Development and attributes of z/Architecture," IBM J. Res. & Dev., Vol. 46, No. 4/5, July/September 2002, pp. 367-379, which are incorporated herein by reference. See also, z/Architecture: Principles of Operation, IBM, SA22-7832-04, 2005 for a detailed z/Architecture description. In at least one embodiment, the host 252 may be an IBM z System mainframe computing system running a version of the z/OS operating system. In such an embodiment, the hosts 252 may use a FICON connection to access data of logical devices.

As noted above in the example 250, the source logical device R1 124 and target logical device R2 126 may be configured as a mirror pair for remote data replication using XRC. XRC is an IBM z System mainframe computer technology for data replication. It combines supported hardware and z/OS software to provide asynchronous replication over long distances. XRC is also known as Global Mirror for z System (XRC). XRC is a z System asynchronous mirroring technique that functions as a combination of code/microcode running on the data storage system 102 including the source logical device R1 124, and application code running on a z System host, such as host 252. The host component of the software running on the host 252 may be referred to as the System Data Mover (SDM). The SDM, for example, ensures that no dependent writes are made out of sequence and data residing on the target logical device R2 126 provides a time consistent copy of the source logical device R1 124 being mirrored. Thus, in the example 250, the asynchronous replication mode of XRC provides for indirect remote replication of source logical device R1 124 on the target logical device R2 126 through the host 252 as the SDM. On the host 252 in at least one embodiment, the z/OS SDM software pulls the updates from the primary or source data storage system 102 and subsequently writes the updates to the target or secondary storage system 104 including the target logical device R2 126.

Generally, a remote replication technology may be configured to support one or more synchronous modes and one or more asynchronous modes depending on the particular technology. For example, a remote replication technology may support a synchronous remote replication mode through direct source data storage system (including the source logical device) to target data storage system (including the target logical device) communication, such as SRDF® operating in synchronous mode as described above; may support a first asynchronous remote replication mode through direct source data storage system to target data storage system communication, such as SRDF® operating in asynchronous mode as described above; and/or may support a second asynchronous remote replication mode through indirect communication between source and target data storage systems through an SDM, such as the host 252, described above.

The example 250 of FIG. 5 described above is an example of using two different or disparate remote replication technologies from different vendors to provide remote replication of a single or same source logical device R1 124 on two different target logical devices R2 126 and R2" 128, respectively, on two different remote data storage systems 104 and 106. The foregoing in example 250 may be configured and used for migration from one of the remote replication technologies, such as XRC, to a second different one of the remote replication technologies, such as SRDF® operating in asynchronous mode (e.g., SRDF®/A) as described above.

In addition to having a single or same source logical device R1 124 configured for use with multiple disparate or different remote replication technologies from different vendors, an embodiment in accordance with techniques herein may also have the source logical device R1 124 configured for use with one or more local replication technologies. In at least one embodiment, the source logical device R1 124 may be configured for use with two (or more) different or disparate local replication technologies from two (or more) different vendors. The source device R1 124 may be configured generally for use with such multiple disparate local replication technologies from different vendors alone, or in combination with, multiple disparate remote replication technologies from different vendors. More generally, an embodiment in accordance with techniques herein may include multiple disparate replication technologies from multiple different vendors where each of the multiple disparate replication technologies from different vendors may be used in connection with local and/or remote replication (e.g. may have a source logical device configured for local replication using a single local replication technology from a first vendor and the source logical device also configured for remote replication using a single remote replication technology from a second different vendor).

Figure 6:
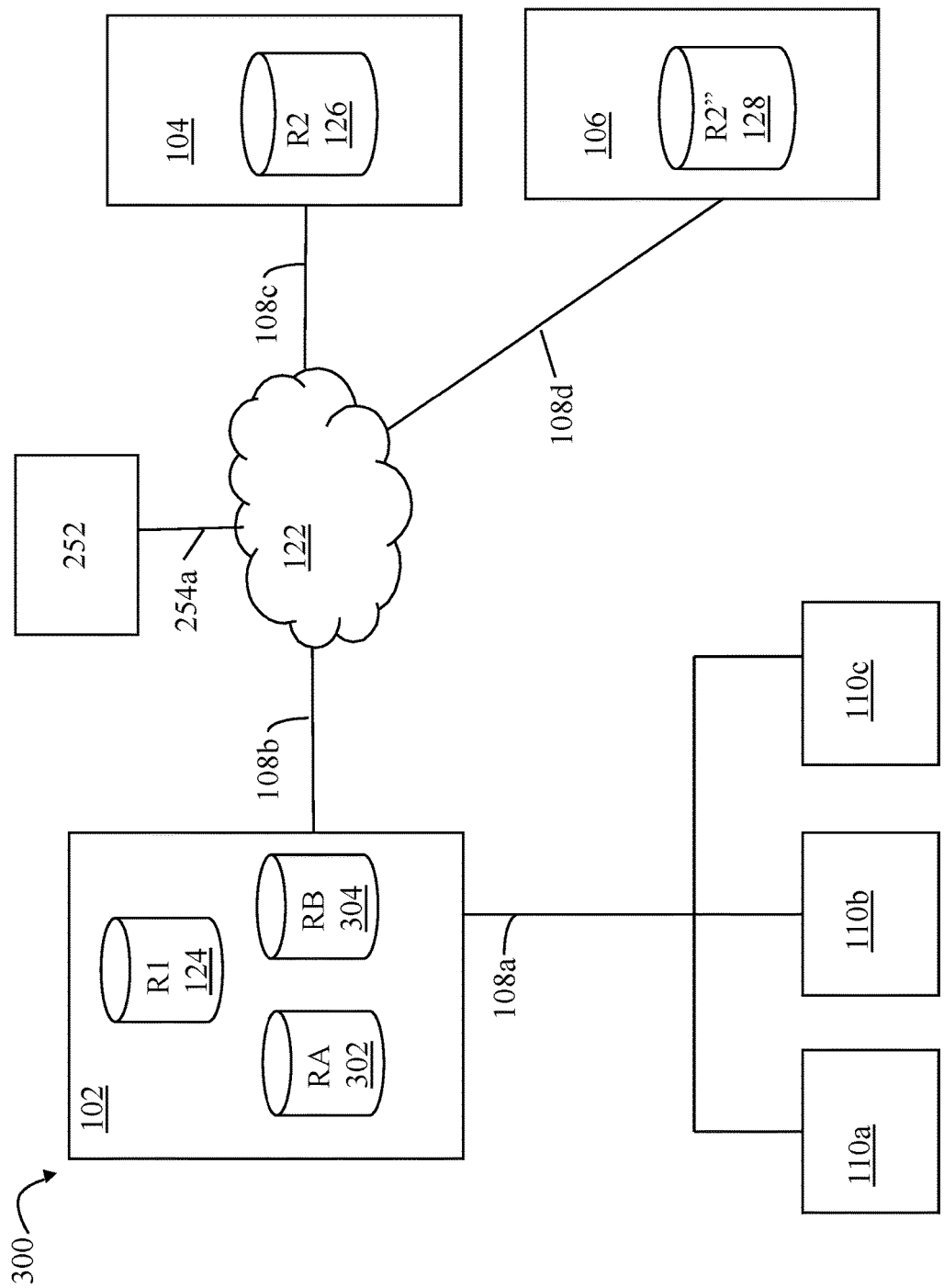

With reference to FIG. 6, shown is an example 300 illustrating use of local replication technologies from different vendors in an embodiment in accordance with techniques herein. The example 300 may include components, systems and a configuration as described above in connection with FIG. 5. The example 300 also includes two additional target logical devices, RA 302 and RB 304. The source logical device R1 124 may be configured for local replication using a first local replication technology with the target logical device RA 302. The source logical device R1 124 may also be configured for local replication using a second local replication technology with the target logical device RB 304. The first and second local replication technologies may be different or disparate local replication technologies from different vendors. For example, the first local replication technology may provide for one or more snapshots of the source logical device R1 124. The first local replication technology may be for example, SnapVX™ by EMC Corporation, configured to create and maintain a first snapshot of R1 124 as the target logical device RA 302.

The second local replication technology may be, for example, FlashCopy® by IBM Corporation. The FlashCopy® function copies data from a source logical device, such as R1 124, to a target logical device, such as R 304. Once the source/target relationship is established, both the source and target are available to hosts for read and write access. In at least one embodiment using techniques herein, the FlashCopy® product has a COPY or NOCOPY option designed to permit the user additional flexibility to decide at the time FlashCopy® is invoked whether or not to make a physical copy of the data by way of background processing. If no physical copy is made (e.g., specifying NOCOPY), the source physical copy is maintained with pointers to the active copy of the data as well as to the virtual point-in-time copy. For example, specifying the COPY operation provides for creating a complete physical bit for bit copy of the source logical device R1 124 on the target logical device RB 304. Specifying the NOCOPY operation provides for creating a virtual point in time copy of the source logical device R1 124 as the target logical device RB 304.

Thus, generally each of the local replication technologies may provide one or more replication modes or options, for example, to create a physical copy of the source logical device on the target logical device, to create a virtual or logical copy of the source logical device as the target logical device, and the like.

The foregoing example 300 of FIG. 6 may be used in a configuration with two different disparate or different local replication technologies from different vendors applied to the same source logical device R1 124, for example, to facilitate migration from one of the local replication technologies to another of the local replication technologies, to provide for simultaneous use of functionality of both local replication technologies, as well as for other reasons and motivations. It should be noted that the local replication technologies used in an embodiment in accordance with techniques herein may also provide for write consistency in a manner similar to that as described herein with remote replication. For example, with FlashCopy® and the COPY operation, the source logical device R1 124 and the target logical device RB 304 may be maintained as a mirrored physical pair of logical devices whereby writes are applied to the target logical device in the same sequence or order in which the writes are applied to the source logical device to maintain write consistency between R1 124 and RB 304.

An embodiment may implement the techniques herein using code executed by a processor. For example, an embodiment may implement the techniques herein using code which is executed by a processor. As will be appreciated by those skilled in the art, the code may be stored on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data replication comprising:
receiving, at a first data storage system, a write operation that writes first data on a source logical device, wherein the source logical device is included in a source logical device group of a first plurality of logical devices of the first data storage system configured for remote replication to a first target logical device group of a second plurality of logical devices on a second data storage system using a first replication technology and wherein the source logical device group is also configured for remote replication to a second target logical device group of a third plurality of logical devices on a third data storage system using a second replication technology different from the first replication technology, wherein said first replication technology includes a first replication service from a first vendor and said second replication technology includes a second replication service from a second vendor different from the first vendor, wherein each of the first plurality of logical devices of the source logical device group is mirrored in a corresponding one of the second plurality of logical devices of the first target logical device group and also mirrored in a second corresponding one of the third plurality of logical devices of the second target logical device group, wherein the first replication service includes first software from the first vendor used in connection with performing remote replication from the source logical device group to the first target logical device group and wherein the second replication service includes second software from the second vendor used in connection with performing remote replication from the source logical device group to the second target logical device group, wherein the first data storage system, the second data storage system, and the third data storage system are a same type of data storage system and wherein the first replication service, the first data storage system, the second data storage system, and the third data storage system are provided by a same vendor, the first vendor; and
responsive to receiving the write operation on the first data storage system, the first data storage system controlling and performing processing comprising:
replicating the write operation, including writing the first data from the source logical device to a first target logical device of the first target logical device group on the second data storage system using the first replication technology; and
replicating the write operation, including writing the first data from the source logical device to a second target logical device of the second target logical device group on the third data storage system using the second replication technology,
wherein data replication of the source logical device group to the first target logical device group is performed using the first replication technology operating in a first replication mode, and data replication of the source logical device group to the second target logical device group is performed using the second replication technology operating a second replication mode, each of the first replication mode and the second replication mode being one of a plurality of replication modes, and wherein the first replication mode is a first asynchronous mode and wherein the second replication mode is a second asynchronous mode, wherein the first asynchronous mode performs data replication directly between two data storage systems, and wherein the second asynchronous mode performs data replication indirectly between two data storage systems using an intervening data mover.

2. The method of claim 1, wherein the source logical device group and the first target logical device group are configured as a first mirrored pair of logical device groups where the source logical device group is mirrored on the first target logical device group using the first replication technology.

3. The method of claim 2, wherein the source logical device group and the second target logical device group are configured as a second mirrored pair of logical device groups where the source logical device group is mirrored on the second target logical device group using the second replication technology.

4. The method of claim 1, wherein the plurality of replication modes includes at least one synchronous replication mode and at least one asynchronous replication mode.

5. The method of claim 1, wherein the intervening data mover receives data modifications from one of the two data storage system and writes the data modifications to another of the two data storage systems.

6. The method of claim 1, wherein the source logical device group on the first data storage system is configured to have data automatically replicated on the first target logical device group of the second data storage system, and wherein the source logical device group on the first data storage system is configured to have data automatically replicated on the second target logical device group of the third data storage system.

7. The method of claim 1, wherein the source logical device is configured for local replication using a first local replication technology on a third target logical device included in the first data storage system with the source logical device.

8. The method of claim 7, wherein the source logical device is configured for local replication using a second local replication technology on a fourth target logical device included in the first data storage system with the source logical device, and wherein the first local replication technology and the second local replication technology are each from a different vendor.

9. The method of claim 8, wherein the first local replication technology uses a first snapshot technique to create the third target logical device as a first snapshot of the source logical device.

10. The method of claim 9, wherein the second local replication technology uses a second snapshot technique to create the fourth target logical device as a second snapshot of the source logical device.

11. The method of claim 9, wherein the second local replication technology creates the fourth target logical device that is a physical copy of the source logical device.

12. The method of claim 1, wherein the first plurality of logical devices, the second plurality of logical devices, and the third plurality of logical devices have data layouts based on a same data storage device architecture supporting variable size records within each logical device.

13. A system comprising:
one or more processors; and
a memory comprising code stored therein that, when executed by at least one of the one or more processors, performs a method for data replication comprising:
receiving, at a first data storage system, a write operation that writes first data on a source logical device, wherein the source logical device is included in a source logical device group of a first plurality of logical devices of the first data storage system configured for remote replication to a first target logical device group of a second plurality of logical devices on a second data storage system using a first replication technology and wherein the source logical device group is also configured for remote replication to a second target logical device group of a third plurality of logical devices on a third data storage system using a second replication technology different from the first replication technology, wherein said first replication technology includes a first replication service from a first vendor and said second replication technology includes a second replication service from a second vendor different from the first vendor, wherein each of the first plurality of logical devices of the source logical device group is mirrored in a corresponding one of the second plurality of logical devices of the first target logical device group and also mirrored in a second corresponding one of the third plurality of logical devices of the second target logical device group, wherein the first replication service includes first software from the first vendor used in connection with performing remote replication from the source logical device group to the first target logical device group and wherein the second replication service includes second software from the second vendor used in connection with performing remote replication from the source logical device group to the second target logical device group, wherein the first data storage system, the second data storage system, and the third data storage system are a same type of data storage system and wherein the first replication service, the first data storage system, the second data storage system, and the third data storage system are provided by a same vendor, the first vendor; and
responsive to receiving the write operation on the first data storage system, the first data storage system controlling and performing processing comprising:
replicating the write operation, including writing the first data from the source logical device to a first target logical device of the first target logical device group on the second data storage system using the first replication technology; and
replicating the write operation, including writing the first data from the source logical device to a second target logical device of the second target logical device group on the third data storage system using the second replication technology,
wherein data replication of the source logical device group to the first target logical device group is performed using the first replication technology operating in a first replication mode, and data replication of the source logical device group to the second target logical device group is performed using the second replication technology operating a second replication mode, each of the first replication mode and the second replication mode being one of a plurality of replication modes, and wherein the plurality of replication modes includes first replication mode is a first asynchronous mode and wherein the second replication mode is a second asynchronous mode, wherein the first asynchronous mode performs data replication directly between two data storage systems, and wherein the second asynchronous mode performs data replication indirectly between two data storage systems using an intervening data mover.

14. The system of claim 13, wherein the source logical device is configured for local replication using a first local replication technology on a third target logical device included in the first data storage system with the source logical device, and wherein the source logical device is configured for local replication using a second local replication technology on a fourth target logical device included in the first data storage system with the source logical device, said first local replication technology and said second local replication technology each provided by a different vendor.

15. A non-transitory computer readable medium comprising code stored thereon that, when executed, performs a method for data replication comprising:
receiving, at a first data storage system, a write operation that writes first data on a source logical device, wherein the source logical device is included in a source logical device group of a first plurality of logical devices of the first data storage system configured for remote replication to a first target logical device group of a second plurality of logical devices on a second data storage system using a first replication technology and wherein the source logical device group is also configured for remote replication to a second target logical device group of a third plurality of logical devices on a third data storage system using a second replication technology different from the first replication technology, wherein said first replication technology includes a first replication service from a first vendor and said second replication technology includes a second replication service from a second vendor different from the first vendor, wherein each of the first plurality of logical devices of the source logical device group is mirrored in a corresponding one of the second plurality of logical devices of the first target logical device group and also mirrored in a second corresponding one of the third plurality of logical devices of the second target logical device group, wherein the first replication service includes first software from the first vendor used in connection with performing remote replication from the source logical device group to the first target logical device group and wherein the second replication service includes second software from the second vendor used in connection with performing remote replication from the source logical device group to the second target logical device group, wherein the first data storage system, the second data storage system, and the third data storage system are a same type of data storage system and wherein the first replication facility service, the first data storage system, the second data storage system, and the third data storage system are provided by a same vendor, the first vendor; and
responsive to receiving the write operation on the first data storage system, the first data storage system controlling and performing processing comprising:
replicating the write operation, including writing the first data from the source logical device to a first target logical device of the first target logical device group on the second data storage system using the first replication technology; and replicating the write operation, including writing the first data from the source logical device to a second target logical device of the second target logical device group on the third data storage system using the second replication technology, wherein data replication of the source logical device group to the first target logical device group is performed using the first replication technology operating in a first replication mode, and data replication of the source logical device group to the second target logical device group is performed using the second replication technology operating a second replication mode, each of the first replication mode and the second replication mode being one of a plurality of replication modes, and wherein the first replication mode is a first asynchronous mode and wherein the second replication mode is a second asynchronous mode, wherein the first asynchronous mode performs data replication directly between two data storage systems, and wherein the second asynchronous mode performs data replication indirectly between two data storage systems using an intervening data mover.

16. The non-transitory computer readable medium of claim 15, wherein the source logical device is configured for local replication using a first local replication technology on a third target logical device included in the first data storage system with the source logical device, and wherein the source logical device is configured for local replication using a second local replication technology on a fourth target logical device included in the first data storage system with the source logical device, said first local replication technology and said second local replication technology each provided by a different vendor.

* * * * *